United States Patent [19]
Peterson et al.

[11] Patent Number: 6,122,313
[45] Date of Patent: *Sep. 19, 2000

[54] SELF-CONTAINED SELF-TESTING DATA MODULATOR

[75] Inventors: Joe William Peterson, Austin, Tex.; Shin Saito, Tokyo, Japan; Dale E. Gulick, Austin, Tex.; Masaru Nonogaki; Toshiaki Iimura, both of Tokyo, Japan

[73] Assignees: Advanced Micro Devices, Austin, Tex.; Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/463,683

[22] Filed: Jun. 5, 1995

Related U.S. Application Data

[63] Continuation of application No. 07/918,626, Jul. 21, 1992, abandoned.

[51] Int. Cl.[7] ........................................... H04B 3/46
[52] U.S. Cl. ............................... 375/224; 375/221
[58] Field of Search .................................... 375/224, 227, 375/296, 285, 357, 359, 365, 366, 368, 225, 226, 228; 332/107, 118, 123, 150, 159, 100, 117, 106; 455/67.1, 423, 425; 370/15; 371/20.4, 20.5

[56] References Cited

U.S. PATENT DOCUMENTS

| 3,909,720 | 9/1975 | Fantera | 455/52.2 |
| 4,199,809 | 4/1980 | Pasahow et al. | 370/110.2 |
| 4,385,384 | 5/1983 | Rosbury et al. | 371/20.6 |
| 4,554,410 | 11/1985 | Furumoto | 179/2 E |
| 4,670,879 | 6/1987 | Okino | 371/27 |
| 5,025,453 | 6/1991 | Hurinville | 375/224 |
| 5,337,316 | 8/1994 | Weiss et al. | 371/20.5 |

OTHER PUBLICATIONS

Federal Register/vol. 64. No. 146/Friday, Jul. 30, 1999.

*Primary Examiner*—William Luther
*Attorney, Agent, or Firm*—Jenkens & Gilchrist A Professional Corporation

[57] ABSTRACT

A system for testing an overall system employing an integrated circuit with a modulator thereon is disclosed. The system for testing includes structure for causing the modulator to continually transmit data and structure for causing the continually transmitted data to exhibit extreme frequency deviation. In both instances the structure may be a single register. This register may also include a set of bits that may be set to select a continuous or an alternating pattern or, stated another way, a maximum or a minimum peak frequency deviation.

12 Claims, 7 Drawing Sheets

SELF-CONTAINED SELF-TESTING DATA MODULATOR

This application is a continuation of Application No. 07/918,626, filed Jul. 21, 1992 now abandoned.

CROSS REFERENCE TO RELATED APPLICATIONS

This application is related to the following U.S. Patent Applications which are hereby incorporated by reference herein:

"General I/O Port Interrupt Mechanism", U.S. patent application Ser. No. 07/917,497, now U.S. Pat. No. 5,448,743; "Improved External Memory Access Control for a Processing Unit", U.S. patent application Ser. No. 07/917,489, now U.S. Pat. No. 5,408,639. "Method Of Weak Pull-Up Disable And Mechanism Therefore For Use With A Microcontroller in Integrated Circuit and Cordless Telephone Using The Integrated Circuit", U.S patent application Ser. No. 07/917,488 (pending); "Interupt Mask Disable Circuit And Method", U.S. patent application Ser. No. 08/346,834 (notice of allowance received and issue fee paid awaiting Patent Number); "Integrated Circuit and Cordless Telephone Using The Integrated Circuit", U.S. patent application Ser. No. 07/918,627 (allowed); "Keypad Scanner Process and Device and Cordless Telephone Employing The Mechanism", U.S. patent application Ser. No. 08/464,072, now U.S. Pat. No. 5,512,893; "Serial Interface Module and Method", U.S. patent application Ser. No. 07/918,624, now U.S. Pat. No. 5,404,459; "Low Power Emergency Telephone Mode", U.S. patent application Ser. No. 08/320,778, now U.S. Pat. No. 5,495,530; "In-Circuit Emulation Capability Mode in Integrated Circuit And Cordless Telephone Using The Integrated Circuit", U.S. patent application Ser. No. 08/387,389; "Clock Generator Capable of Shut-down Mode and Clock Generation Method"; U.S. patent application Ser. No. 08/201,077, now U.S. Pat. No. 5,502,689; and "Signal Averager", U.S. patent application Ser. No. 07/918,621, now U.S. Pat. No. 5,420,904."

All of the related applications are filed on even date herewith, are assigned to the assignee of the present invention, and are hereby incorporated herein in their entirety by this reference thereto.

BACKGROUND OF THE INVENTION

1. Field of the Invention

The present invention generally relates to processing systems for testing products including a modulator. More particularly, the present invention relates to systems for testing products that manipulate digital data and that include an I/Q modulator.

2. Description of Related Art

As is well known to those skilled in the art, data may be transmitted using a carrier signal via a modulation process. Modulation processes involve the encoding of source data onto a carrier signal. During modulation, one or more of three fundamental frequency-domain parameters—that is, amplitude, frequency, and phase—is or are operated upon.

A distinction must be made between analog and digital data and analog and digital signals. Viewing modulation processes broadly, four different combinations are possible: (1) digital data may be encoded into a digital signal; (2) digital data may be encoded into an analog signal; (3) analog data may be encoded into a digital signal; and (4) analog data may be encoded into an analog signal. There are various reasons why one combination may be preferred over the others in a particular situation. For example, with respect to the combination most relevant to the discussion herein, the combination of encoding digital data into an analog signal, it is often used because certain equipment processes digital data but some transmission media, such as optical fiber and the unguided media, will only propagate analog signals. One of the most familiar uses of the digital data to analog signal transformation revolves around the transmission of digital data through the public telephone network, which was designed to receive, switch, and transmit analog signals in the voice-frequency range of about 300 to 3400 Hz.

As previously mentioned, modulation involves operation on one or more of three characteristics of a carrier signal. Those three characteristics are amplitude, frequency and phase. Not surprisingly, therefore, there are three basic modulation techniques for encoding digital data into analog signals: amplitude-shift keying (ASK) hereinafter; frequency-shift keying (FSK) hereinafter; and phase-shift keying (PSK) hereinafter.

The FSK modulation technique, the one most immediately relevant, involves representing the two binary values by two different frequencies near the carrier frequency. Typically, the two different frequencies are offset from the carrier frequency by equal but opposite amounts. FSK is commonly used on voice grade lines up to 1200 bps. FSK is also often used for high-frequency (e.g., 3 to 30 MHz) radio transmission.

Another concept relevant to the present invention is quadrature modulation. Quadrature modulation, which is a process well known to those skilled in the art, is the modulation of two carrier components 90 degrees apart in phase by separate modulating functions. Quadrature modulation has become a popular technique for more efficiently using bandwidth by having each signalling element represent more than one bit.

Still yet another concept relevant to the present invention is the concept of ensuring output signal quality of a particular signal processing product is high. Although the desirability of having high output signal quality of such a product is self-evident, there has not heretofore been developed a commercially viable, virtually foolproof method of verifying output signal quality that can be built into such products themselves. Stated another way, heretofore transmitters and the like have not been enabled to produce certain patterns designed to facilitate testing at the system level. Having a build in "tester", if you will, is desirable as it is readily accessible. However, there has not yet been developed such a "tester" simple and inexpensive enough to allow it to be incorporated into a commercial product. It should be readily apparent based upon the foregoing that the lack of such an output signal content verifier or tester is a shortcoming and deficiency of the prior art.

SUMMARY OF THE INVENTION

The present invention overcomes the shortcoming and deficiency mentioned above by providing a system for testing an overall system employing an integrated circuit with a modulator thereon. The system for testing includes structure for causing the modulator to continually transmit data and structure for causing the continually transmitted data to exhibit extreme frequency deviation. In both instances the structure may be a single register. This register may also include a set of bits that may be set to select a continuous or an alternating pattern or, stated another way, a maximum or a minimum peak frequency deviation.

The present invention also overcomes the shortcoming and deficiency of the prior art mentioned above by providing a method for testing an overall system employing an integrated circuit with a modulator thereon. The method for testing includes the step of causing the modulator to continually transmit data, and the step of causing the continually transmitted data to exhibit extreme peak frequency deviation. In embodiments of the method according to the teachings of the present invention, both steps may be performed by a register. As in the system according to the teachings of the present invention, this register may include a set of bits that may be set to select a continuous or an alternating pattern or, stated another way, a maximum or a minimum peak frequency deviation.

Accordingly, it is an object of the present invention to provide an on-chip I/Q modulator having the capacity to output special data sequences.

Another object of the present invention is to provide a simple system and method for testing overall systems that employ a particular integrated circuit.

Yet another object of the present invention is to provide a system and method for generating test modes that enable or facilitate factory testing of units that include a special integrated circuit.

BRIEF DESCRIPTION OF THE DRAWINGS

For a more complete understanding of the present invention, and for further objects and advantages thereof, reference may now be made to the following detailed description taken in conjunction with the accompanying drawings wherein.

DETAILED DESCRIPTION OF THE INVENTION

Figure 1:
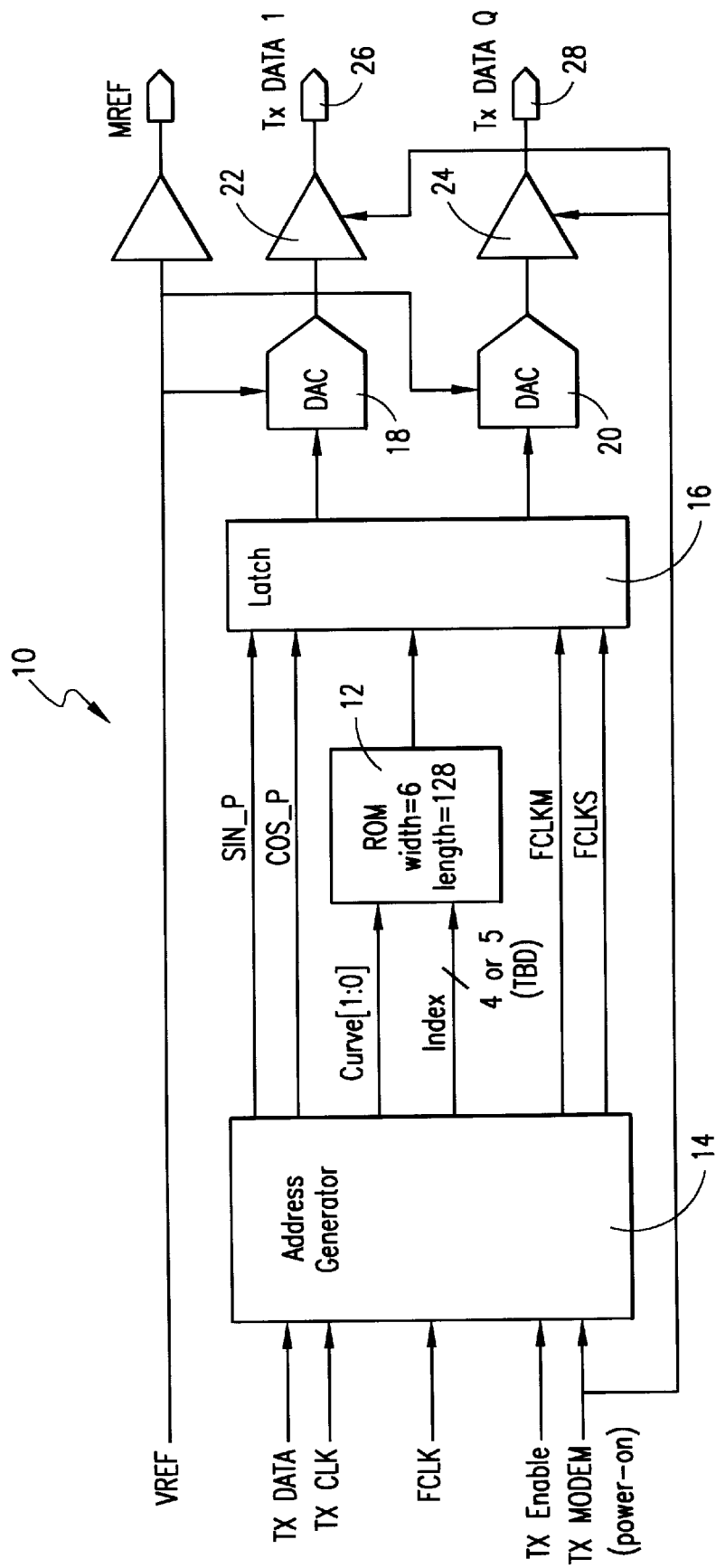
FIG. 1 is a block diagram of a transmit modulator including a test mode subsystem according to the teachings of the present invention.

Referring now to the drawings and, more particularly, to FIG. 1, there is shown a block diagram of a transmit modulator (generally designated by reference numeral 10) including a test mode subsystem according to the teachings of the present invention. In operation, the transmit modulator 10 accepts serial data and converts it to a quadrature pair of single-ended analog outputs. These outputs can then be externally mixed with an (intermediate frequency) hereinafter IF carrier and summed to obtain a desired frequency modulated signal.

The heart of the modulator 10 is a look-up Read Only Memory or ROM 12 addressed by a data dependent state machine address generator 14 and followed by a series of synchronizing latches 16. Two identical DAC's 18, 20 followed by buffers 22, 24 drive the analog outputs 26, 28.

As previously mentioned, the transmit modulator 10 includes a test mode capability to simplify spectral measurements. This test mode capability is the focus of the present invention and it is discussed in detail below. Before that discussion, however, set forth are certain details regarding transmit modulator requirements. These requirements are discussed herein, and at this point, to further understanding of an environment in which the present invention may be employed. That understanding should, in turn, facilitate understanding of the structure and operation of embodiments of the present invention.

Still further with respect to modulator 10, it should be understood that modulator 10 has been actually constructed and used with great success. Thus, certain specific details regarding the structure and operation of modulator 10 are set forth below. These details should be understood as being exemplary only, and not limiting what may be included or shown in embodiments of the present invention.

The modulator outputs, when properly mixed by a mixer with the external IF signal, produce a filtered FSK signal which complies with the CT2-CAI spectral requirements. An external passive single-pole low pass filter at 100 kHz may be disposed between each output and the mixer to reduce spurious emissions.

Figure 2:
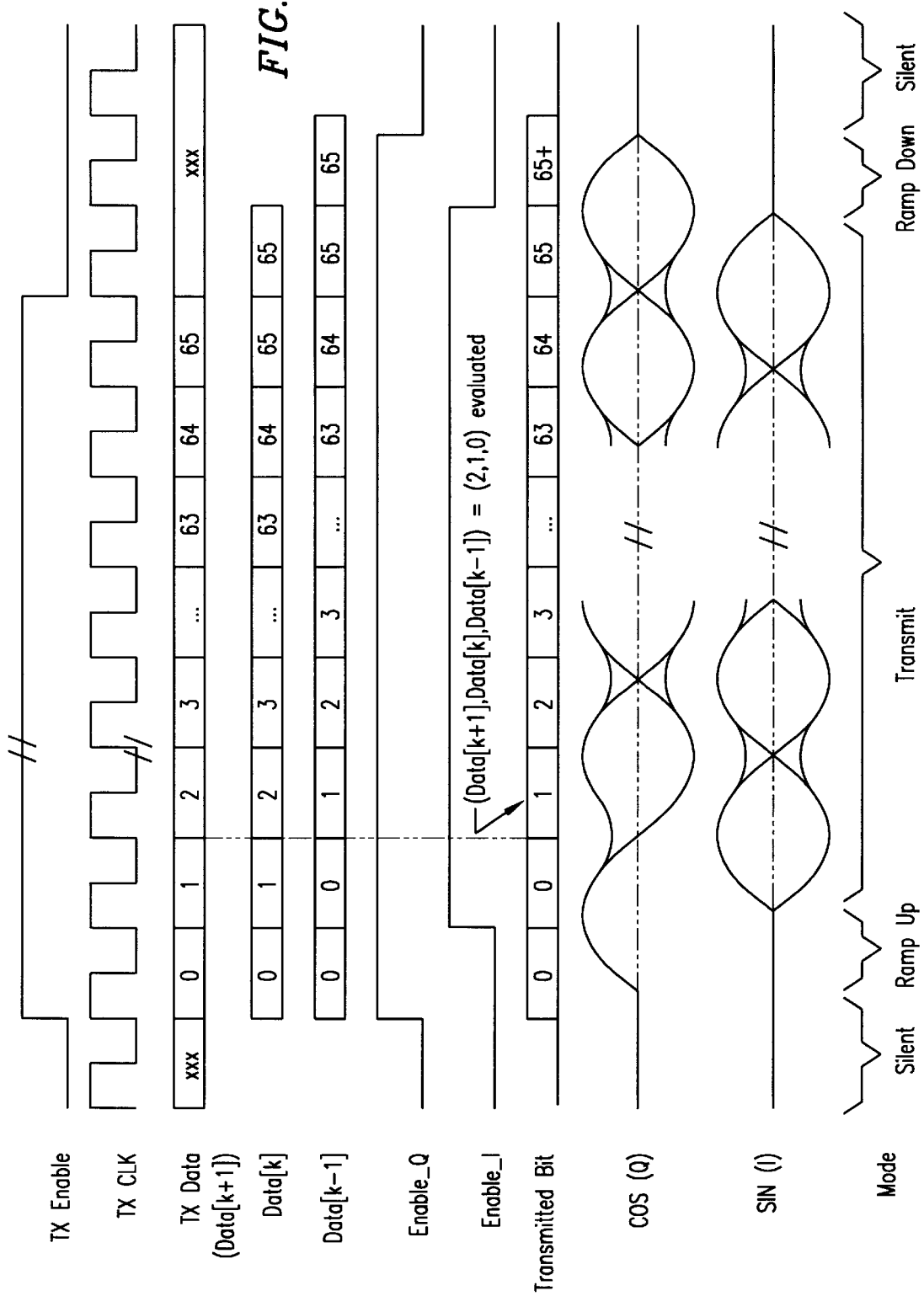
FIG. 2 depicts desirable ramp up and ramp down functions for the transmit modulator depicted in FIG. 1.

Regarding absolute delay from input to output, in the actually constructed modulator 10, the nominal delay from the time a bit is received at the rising edge of TXCLK to the time the corresponding output frequency trajectory commences is X $\mu s \pm 108$ ns+Y ns (digital logic delay X=approximately 14 $\mu s$; analog buffer delay Y=approximately 500 ns). Delays to I and Q outputs are identical except for DAC and analog buffer propagation delays. This point is illustrated in FIG. 2, wherein desirable ramp up and ramp down functions for the modulator 10 are shown.

With respect to spectral requirements, all spectral requirements apply to I and Q outputs referenced to MREF and filtered by single-pole passive low pass filters with 3 dB frequency at 100 kHz. In the actually constructed embodiment of the modulator 10, all dBV values are based on the assumption that −9 dBV at I and Q yields +10 dBm at the final radio frequency RF output. Adjacent channel power and spurious emissions are measured during constant transmission of pseudorandom data and during constant transmission of data corresponding to an adaptive differential pulse code modulation ADPCM silent code (all 0's) at the scrambler input of the frame formatter.

In the actually constructed modulator 10, op amp power-on and power-off settling times are about 100 $\mu sec$ maximum.

Additional details regarding spectral requirements of the actually constructed modulator 10 are set forth in the chart immediately below.

| MODULATOR SPECTRAL REQUIREMENTS | |
|---|---|
| DESCRIPTION | CAI SPECIFICATION |
| adjacent channel power for random data integrated over ± 40 kHz band | Spec: Section 4.5.5. −39 dBV max |
| spurious emissions between 150 kHz and 2.0 MHz | Spec: Section 4.7.2 −55 dBV max |

-continued

| MODULATOR SPECTRAL REQUIREMENTS | |
|---|---|
| DESCRIPTION | CAI SPECIFICATION |
| spurious emissions above 2.0 MHz | Spec: Section 4.7.2 −73 dBV max |
| peak spurs at 100 kHz during Ping-pong switching | Spec:Section 4.5.6 −45 dBV max |
| peak spurs at 500 kHz during Ping-pong switching | Spec: Section 4.5.6 −79 dBV max |

As previously mentioned, with regard to ramp up and ramp down requirements, FIG. 2 depicts the desired ramp up and ramp down functions. During the first bit interval after TX Enable goes high, the Q output follows curve 00 from 0 to +1 (full scale) while the I output is force to 0 VAC. The effect of this sequence is that at the external mixer the output is ramped from 0 VAC to full scale at the IF carrier frequency.

At the beginning of the transmit mode which follows, the initial phase offset is zero and I and Q outputs depend on the input data pattern. At the end of the transmit burst, the data {k+1} bit, which lies after the transmitted data frame and may be unpredictable, is manipulated in modulator 10 in order to guarantee convergence of the I output to zero at the end of the bit period. The Q output is likewise guaranteed to converge to one of two positions, ± full scale.

During the ramp down mode, the I output is held at zero and the Q output goes from its previous value of ± full scale to zero, following curve 00.

The Enable_I and Enable_Q control bits demonstrate when the respective DAC's and buffers are enabled (high) or driving zero volts (low). This point is illustrated in FIG. 2.

With respect to DAC requirements, in the actually constructed modulator 10, the I and Q outputs are driven through buffers by identical DAC's updated at 4.608 MHz.

Discussing the modulator 10 now functionally, the modulator 10 receives serial input data, dataclock, and a transmit enable signal from other, larger system components. The actual filtering and modulation of the data is performed by mapping the input sequence to one of eight possible output patterns stored in ROM. The selected ROM patterns are then transferred to two D/A's and buffered by on-chip op amps.

The transformation from input data to ROM sequence requires knowledge of the current data bit, the previous data bit, and the next data bit; as a result, there is at least a one bit delay when going through the modulator.

A test mode is provided that forces continuous transmission for ease in measuring the output spectrum and output power. In the test mode according to the teachings of the present invention, the input data can be forced to all 1's, all 0's, or alternating 1/0's. Once again, further details are set forth later below.

With respect to operational modes, the modulator 10 has six modes of operation:

Power down. When the TX MODEM ENABLE bit of a Module Enable Control Register 0 is zero, power consumption is reduced because the clocks within the modulator stop and I, Q, and MREF outputs are disabled.

Silent. When the TX MODEM ENABLE bit is high but the TX Enable input is low, the modulator clocks stop under set timing constraints and I, Q and MREF analog outputs drive a DC output voltage of approximately VCC/2 with no AC signal. Analog drivers are powered-up in silent mode to reduce power-up/power-down transients during the Ping-pong CT2 protocol.

Ramp Up. Every time a burst of data is sent to the modulator, marked by TX Enable going high when the TX MODEM ENABLE bit is high, a one bit-time ramp up sequence occurs to minimize transients from the silent to transmit modes. TXCLK is synchronized to the PLL1152 clock output from associated logic.

Transmit. Normal transmission of FSK proceeds after a ramp up when TX Enable and the TX MODEM ENABLE bit are high. Normal transmission may include any even number of data bits. This mode supports the constant transmission necessary for spectrum measurement and test modes. TXCLK is synchronized to the PLL1152 output.

Ramp Down. Every time normal transmission ceases, marked by TX Enable going low while the TX MODEM ENABLE bit is high, the modulator completes a one bit-time ramp down sequence to minimize transient noise in the transition from transmit to silent mode. TXCLK is synchronized to the PLL1152 output.

Test Modes. Constant 1's, constant 0's, or alternating 1's and 0's can be transmitted according to the Test Control Register, overriding Silent mode. In test mode, the bit clock is generated by dividing the crystal oscillator frequency to 72 kHz instead of using TXCLK.

The normal sequence of modes is Power Down; Silent; Ramp Up; Transmit; Ramp Down; Silent; Ramp Up; Transmit; Ramp Down; Silent; and Power Down.

Now, discussing the transmit modulator test mode system and method of the present invention, as previously mentioned, the on-chip I/Q modulator 10 contains the capability to output special data sequences that simplify the testing of systems that employ the IC. In the actually constructed modulator 10 the test mode capability is effected by a Test Control Register, depicted in FIG. 3, and generally designated by reference numeral 30. The actually used register 30 employs 3 bits, has a default of XXXXXXOOO, can be accessed by reads and writes, is set by software, and cleared by software or reset.

According to the teachings of the present invention, bits in this register 30 force the modulator 10 to output all ones, all zeros, or to an alternating one zero one zero pattern. These patterns facilitate frequency deviation measurements. In the actually constructed embodiment of the present invention, when the deviation test mode is enabled, the Rx and Tx Enable pins are forced to the transmit state. Additionally, a mode is provided that allows the transmit data pattern to be input directly from the B/D port.

Figures 3, 4:
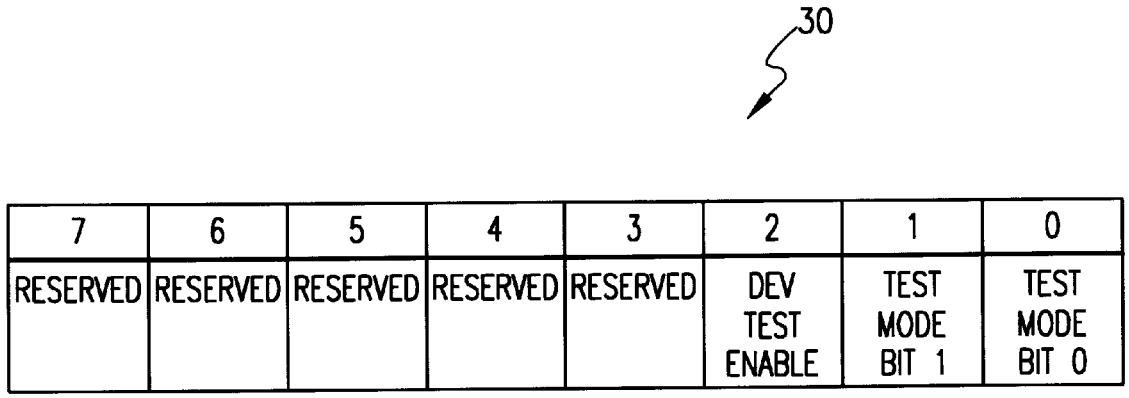
FIG. 3 is a block diagram of a register that may be employed in embodiments of the present invention.
FIG. 4 is a chart depicting possible bit sequences and output in embodiments of the present invention.

Further details regarding each of the bit positions depicted in FIG. 3 follow:

BITS 7–3 Reserved—Write operations must write zeros. Reads return an indeterminate value. A read-modify-write operation can write back the read value.

BIT 2 Deviation Test Enable—When set, the modulator 10 enters test mode, in which it continually transmits data. Data content is determined by bits [1:0] of the Test Control Register 30. The TX CLK signal is supplied by a conventional crystal oscillator divided down to 72 kHz. The TX Enable, TX CLK, and TX Data inputs from a conventional frame formatter are ignored. The Test Enable bit is forwarded to the frame formatter so that it may control external circuitry through the TX/RX Enable pin. When cleared, the modulator operates normally, accepting TX CLK, TX Enable, and TX DATA from the frame formatter.

BITS[1:0] Test Mode [1:0]—When the Deviation Test Enable is high the Test Mode bits select a continuous data transmission pattern. Transmitting static data is intended to generate maximum peak frequency deviation. Transmitting alternating 1's and 0's (10101010 . . . ) is intended to generate minimum peak frequency deviation. When transmitting alternating data the first bit sent is a 1. Additionally, a data pattern can be input directly from the B/D port. FIG. 4 depicts bit and output relationships in the actually constructed embodiments of the present invention.

Figure 6:
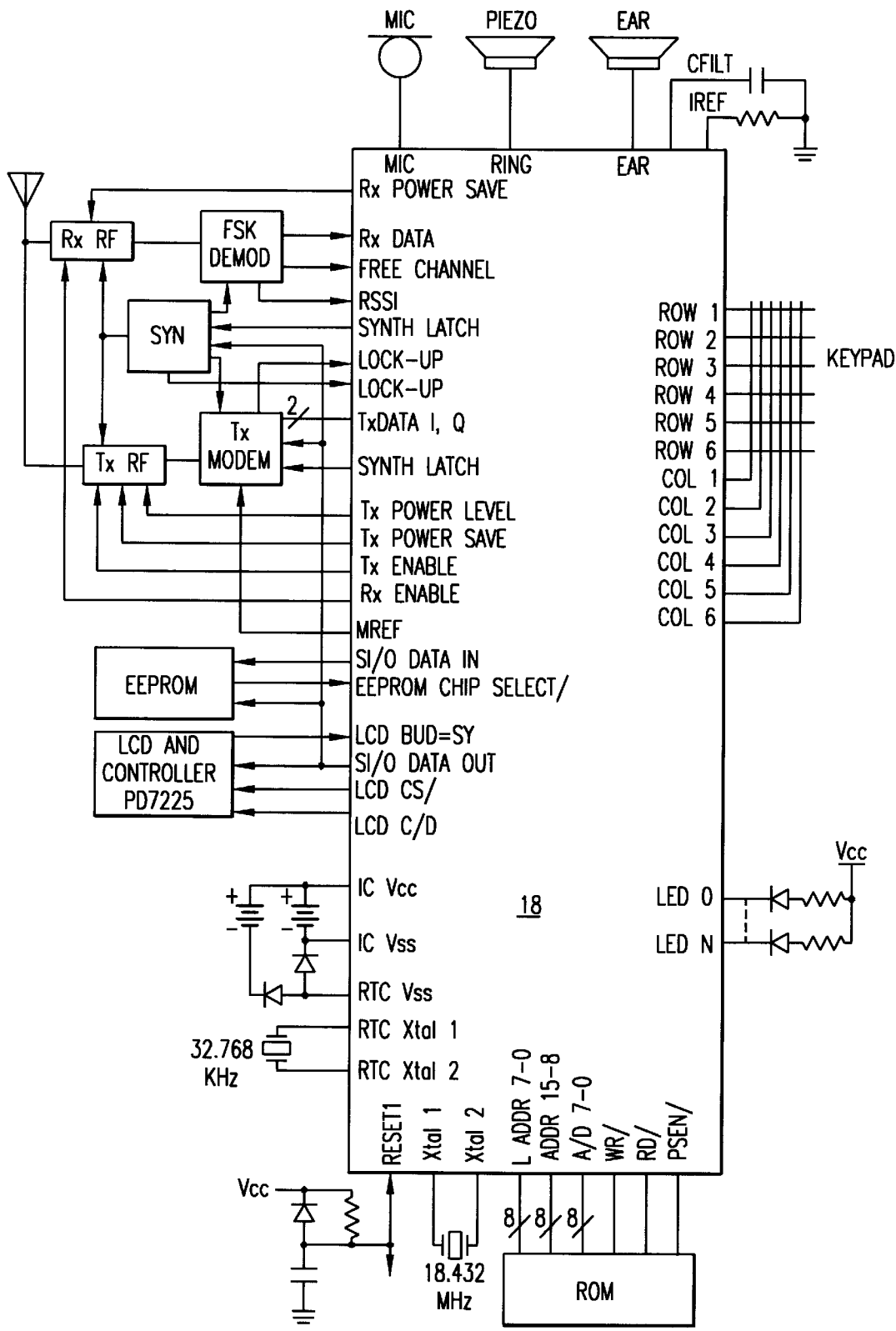
FIG. 6 is a block diagram of a handset unit of a cordless telephone into which the IC of FIG. 5 has been installed.
Figure 7:
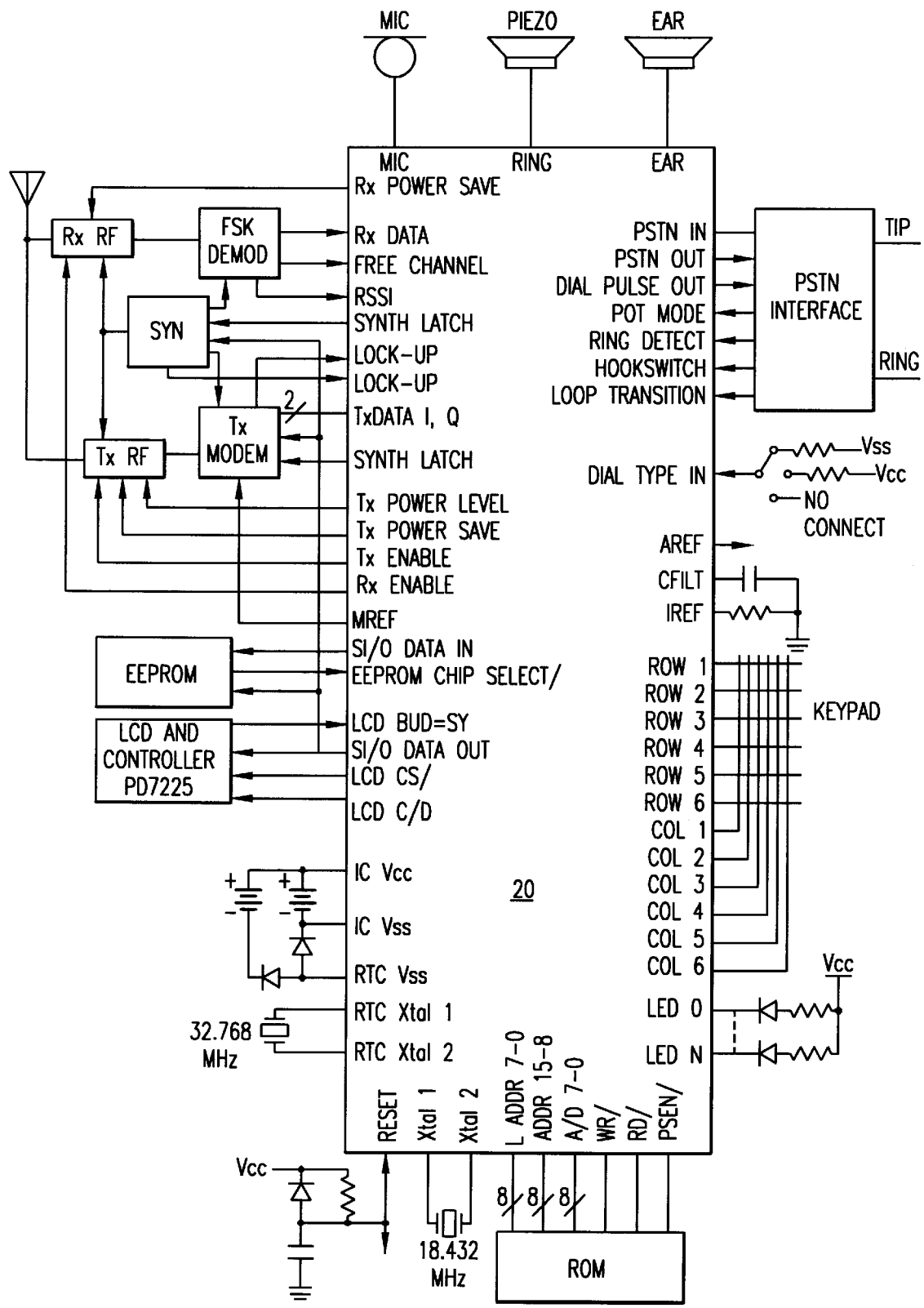
FIG. 7 is a block diagram of a base unit of a cordless telephone into which the IC of FIG. 5 has been installed.

To further facilitate development of an appreciation within those skilled in the art of the use of an embodiment of the present invention, set forth in FIG. 5 is a block diagram of an integrated circuit including a transmit modulator or modem 10. FIGS. 5 and 7 show how the IC of FIG. 5 may be incorporated into a cordless telephone handset and base station. All of these FIGS. 5–7 and each element depicted in them are discussed at length in various of these related cases. These FIGS. are significant here, and therefore included herein, because they show how an embodiment of the present invention may be incorporated into an actual commercial product.

Based upon the foregoing, those skilled in the art should now fully understand the structure and operation of the present invention. Those persons should also appreciate how the present invention overcomes certain shortcomings and deficiencies of the prior art by providing a built-in tester for a commercial product that processes signals. More specifically, the present invention provides an on-chip I/Q modulator having the capacity to output special data sequences. Embodiments of the present invention can be very simple, and also very effective at verifying the spectral content of output signals of certain commercial products.

Obviously, numerous modifications and variations are possible in view of the above teachings. Accordingly, within the scope of the appended claims, the present invention may be practiced otherwise than as specifically described herein.

What is claimed is:

1. A self testing modulator comprising:

means for modulating a carrier signal in response to inputted digital signals, wherein said means to modulate comprises a ROM having a look up table and which is addressed by a data dependent state machine coupled to digital to analog converters;

means to demodulate a carrier signal for extracting a digital signal sent on the so modulated carrier signal;

memory means for storing a self testing pattern;

means for causing said modulator to transmit data in response to a signal thereby placing said modulator in a self test mode independent of a communication path;

means for synchronizing said continually transmitted data when in said self test mode; and means for causing the modulation of said carrier signal to modulate by providing a digital signal stream of all "1"s.

2. A system as recited in claim 1, wherein said memory comprises a bit which is settable in response to said signal placing said system in a self test mode.

3. A self testing modulator comprising:

means for modulating a carrier signal in response to inputted digital signals, wherein said means to modulate comprises a ROM having a look up table and which is addressed by a data dependent state machine coupled to digital to analog converters;

means to demodulate a carrier signal for extracting a digital signal sent on the so modulated carrier signal;

memory means for storing a self testing pattern;

means for causing said modulator to transmit data in response to a signal thereby placing said modulator in a self test mode independent of a communication path;

means for synchronizing said continually transmitted data when in said self test mode; and means for causing the modulation to modulate said carrier signal by providing a digital signal stream of all "0"s.

4. A self testing modulator comprising:

means for modulating a carrier signal in response to inputted digital signals, wherein said means to modulate comprises a ROM having a look up table and which is addressed by a data dependent state machine coupled to digital to analog converters;

means to demodulate a carrier signal for extracting a digital signal sent on the so modulated carrier signal;

memory means for storing a self testing pattern;

means for causing said modulator to continually transmit data in response to a signal thereby placing said modulator in a self test mode independent of a communication path;

means for synchronizing said continually transmitted data when in said self test mode; and means for causing the modulation to modulate said carrier signal by providing a digital signal stream of alternating "0"'s and "1"'s.

5. A self testing modulator comprising:

means for modulating a carrier signal in response to inputted digital signals, wherein said means to modulate comprises a ROM having a look up table and which is addressed by a data dependent state machine coupled to digital to analog converters;

means to demodulate a carrier signal for extracting a digital signal sent on the so modulated carrier signal;

memory means for storing a self testing pattern;

means for causing said modulator to continually transmit data in response to a signal thereby placing said modulator in a self test mode;

means for synchronizing said continually transmitted data when in said self test mode; and means for causing said modulation to modulate said carrier signal by providing a digital signal stream a predetermined pattern of "0"'s and "1"'s.

6. In an overall system employing an integrated circuit with a modulator thereon, a system for testing the modulator of said overall system, said tested modulator system comprising:

a modulator, wherein said modulator comprises a ROM having a look up table and which is addressed by a data dependent state machine coupled to digital to analog converters;

means to place said modulator of said overall system in a test mode independent of a communication path;

means for causing said modulator to continually transmit data when said system is in a test mode;

means for synchronizing said continually transmitted data when in a test mode;

means for causing said continually transmitted data to exhibit a modulation having a frequency deviation; and wherein said frequency deviation is based in response to a predetermined test pattern.

7. A system as recited in claim 6, wherein said means for causing said modulator to continually transmit data and said means for causing said continually transmitted data to exhibit extreme peak frequency deviation both comprise a register.

8. A system as recited in clime 7, wherein said register comprises a bit which may be set to cause said modulator to continually transmit data.

9. A system as recited in claim 8, wherein said register further comprises a set of bits which may be set to determine data content of said predetermined test pattern.

10. A system as recited in claim 9, wherein said set of bits may be set to select a continuous data transmission of said predetermined test pattern.

11. A system as recited in claim 10, wherein said set of bits may also be set to select an alternating data transmission pattern.

12. A system as recited in claim 6, wherein said means for causing said continually transmitted data to exhibit frequency deviation comprises means for causing said continually transmitted data to exhibit maximum frequency deviation and minimum frequency deviation.

* * * * *

UNITED STATES PATENT AND TRADEMARK OFFICE
CERTIFICATE OF CORRECTION

PATENT NO.    : 6,122,313
DATED         : September 19, 2000
INVENTOR(S)   : Joe William Peterson et al.

It is certified that error appears in the above-identified patent and that said Letters Patent is hereby corrected as shown below:

<u>Title page, Item [54] and Column 1, line 1,</u>
Replace "SELF-CONTAINED SELF-TESTING DATA MODULATOR" with
-- SELF-CONTAINED SELF-TESTED MODULATOR --

<u>Title page,</u>
Item [56], U.S. PATENT DOCUMENTS,
Replace "   3,909,720     with --  3,909,720*
           4,199,809              4,199,809*
           4,385,384              4,385,384*
           4,554,410              4,554,410*
           4,670,879              4,670,879*
           5,025,453              5,025,453*
           5,337,316"             5,337,316* --

Figure 5A:
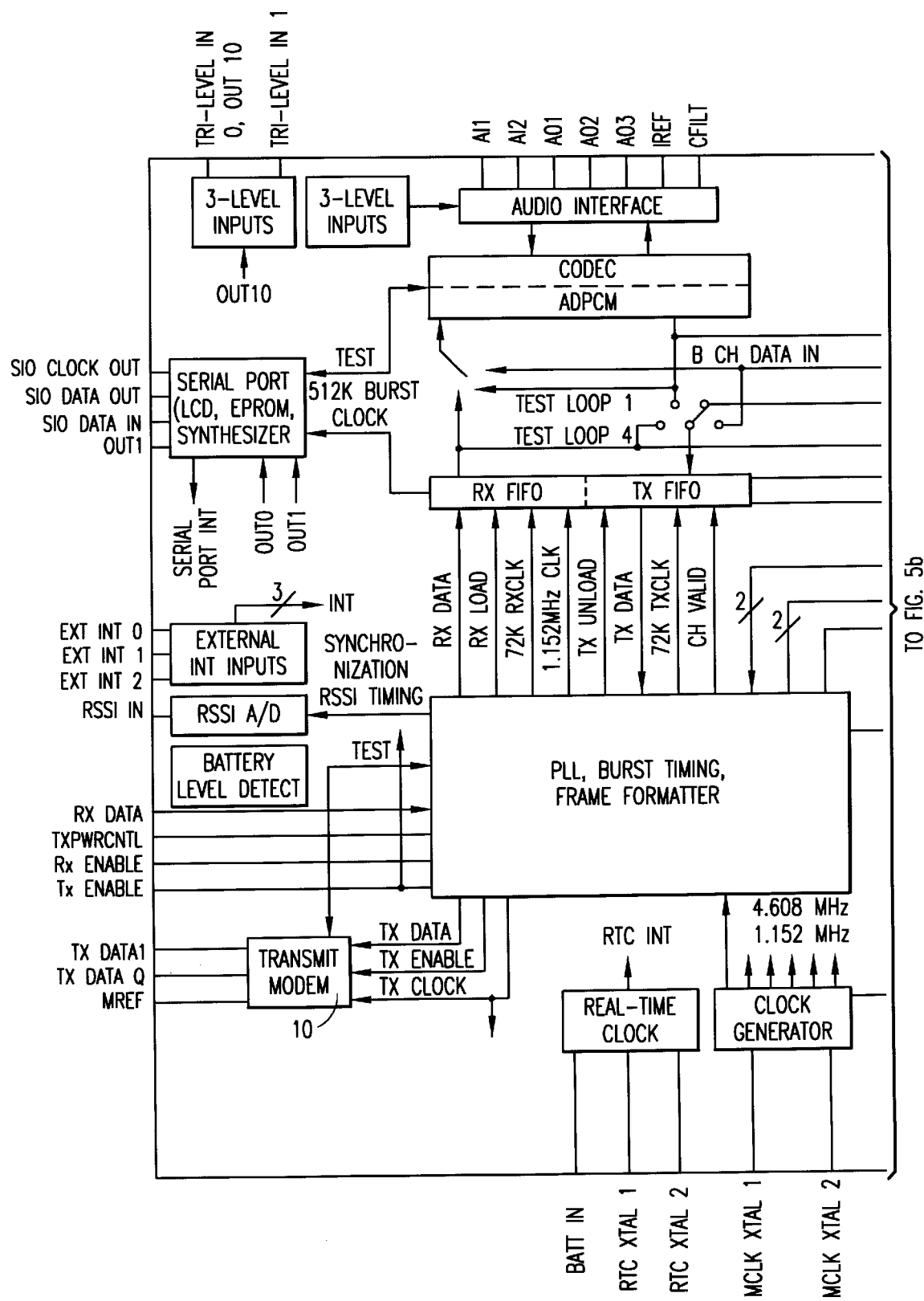
FIG. 5 (which consists of FIGS. 5a and 5b) is a block diagram or an integrated circuit (IC) including an embodiment the present invention.
Figure 5B:
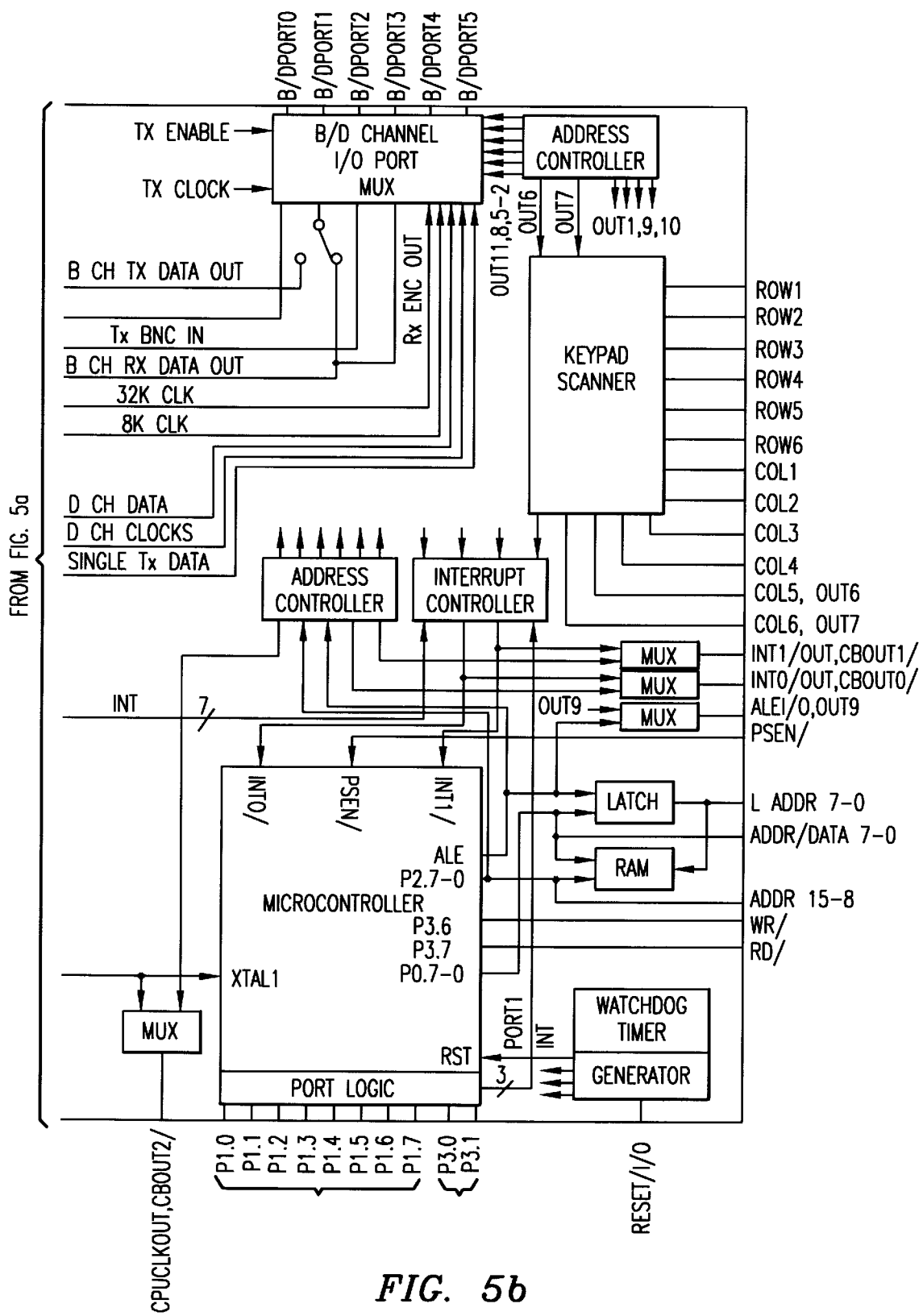

<u>Drawings,</u>
Figure 5a, (Reference 3-Level Input connected to the Audio Interface) replace "3-LEVEL INPUTS" with -- Tone Ringer --
Figure 5b, replace "ADDRESS CONTROLLER" with -- Output Latch --.
Figure 5b, replace "GENERATOR" with -- Reset --
Figure 6, replace "LCD BUD=SY" with -- LCD BUSY --
Figure 7, replace "LCD BUD=SY" with -- LCD BUSY --

<u>Column 3,</u>
Line 44, replace "the present invention;" with -- of the present invention; --

<u>Column 9,</u>
Line 8, replace "clime 7," with -- claim 7, --

Signed and Sealed this

Twenty-ninth Day of July, 2003

JAMES E. ROGAN
*Director of the United States Patent and Trademark Office*